United States Patent
Kidron et al.

(10) Patent No.: US 10,437,717 B2
(45) Date of Patent: Oct. 8, 2019

(54) DEFECT REPORTING IN APPLICATION TESTING

(71) Applicant: ENTIT SOFTWARE LLC, Sanford, NC (US)

(72) Inventors: Adi Kidron, Yehud (IL); Tsila Cochavi, Yehud (IL); Avigad Mizrahi, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/544,287

(22) PCT Filed: Jan. 29, 2015

(86) PCT No.: PCT/US2015/013465
§ 371 (c)(1),
(2) Date: Jul. 18, 2017

(87) PCT Pub. No.: WO2016/122517
PCT Pub. Date: Aug. 4, 2016

(65) Prior Publication Data
US 2018/0004648 A1    Jan. 4, 2018

(51) Int. Cl.
*G06F 9/44* (2018.01)
*G06F 11/36* (2006.01)

(52) U.S. Cl.
CPC ........ *G06F 11/3692* (2013.01); *G06F 11/368* (2013.01); *G06F 11/3664* (2013.01); *G06F 11/3688* (2013.01)

(58) Field of Classification Search
CPC . G06F 9/44; G06F 11/00; G06F 11/36; G06F 17/30
See application file for complete search history.

(56) References Cited

U.S. PATENT DOCUMENTS 7,644,393 B2   1/2010  Glerum et al.
7,836,346 B1  11/2010  Davidov et al.
(Continued)

OTHER PUBLICATIONS

Nor Shahida Mohamad Yusop, Understanding Usability Defect Reporting in Software Defect Repositories, ACM, 2015, retrieved online on Jun. 7, 2019, pp. 134-137. Retrieved from the Internet: <URL: http://delivery.acm.org/10.1145/2820000/2817757/p134-yusop.pdf?>. (Year: 2015).*

(Continued)

*Primary Examiner* — Hanh Thi-Minh Bui

(57) ABSTRACT

The present subject matter relates to defect reporting in application testing. In an implementation, a category of application testing is determined based on a testing instance of an application. The category of application testing is indicative of an aspect of the application, being tested. A list of previously reported defects associated with the determined category of application testing is displayed in a display layer over the testing instance of the application. A first user-input indicative of one of acceptance and rejection of a previously reported defect, from the list, with respect to the testing instance of the application is received. The first user-input is aggregated with previous user-inputs indicative of one of acceptance and rejection of the previously reported defect. It is determined whether the previously reported defect is irrelevant to the testing instance of the application based on the aggregation.

14 Claims, 8 Drawing Sheets

(56) References Cited

U.S. PATENT DOCUMENTS

| | | | |
|---|---|---|---|
| 8,151,248 B1 | 4/2012 | Butler et al. | |
| 8,213,871 B1 | 7/2012 | Cogan et al. | |
| 2008/0120602 A1 | 5/2008 | Comstock et al. | |
| 2010/0057693 A1 | 3/2010 | Himstedt et al. | |
| 2010/0121520 A1* | 5/2010 | Yukawa | G06F 11/0739 701/31.4 |
| 2011/0258609 A1 | 10/2011 | Maczuba | |
| 2013/0019028 A1* | 1/2013 | Myers | G06F 17/2235 709/246 |
| 2016/0371173 A1* | 12/2016 | Ignatyev | G06F 11/3688 |

OTHER PUBLICATIONS

Alipour, A. et al., A Contextual Approach Towards More Accurate Duplicate Bug Report Detection, Date Unknown, 10 pages http://softwareprocess.es/a/bugdedup.pdf.

International Searching Authority, International Search Report and Written Opinion; PCT/US2015/013465; dated Sep. 1, 2015; 10 pages.

Sun, C. et al., Towards More Accurate Retrieval of Duplicate Bug Reports, Date Unknown, 10 pages chengniansun.bitbucket.org/papers/ase11.pdf.

Wang, X. et al., An Approach to Detecting Duplicate Bug Reports Using Natural Language and Execution Information, May 10-18, 2008, 10 pages http://sei.pku.edu.cn/~wangxy06/ic.

* cited by examiner

| ABC Application Ver 1.1.2 : User Login | | | | | | |
|---|---|---|---|---|---|---|
| Login Name : XYZ123 | | LOGIN | | | | |
| Password : ********** | | CANCEL | | | | |
| [+ Add New Defect] | | | | | | |
| Previously Reported Defects | | | | | | |
| Name | Comments | Criticality Factor | Date-Time | User | Priority | Count |
| A1 | DEF.... | 5 | xx/xx xx:xx | U1 | 1 | 10 |
| A2 | GHI.... | 4 | xx/xx xx:xx | U2 | 2 | 8 |
| A3 | JKL.... | 3 | xx/xx xx:xx | U3 | 3 | 12 |
| ... | ... | ... | ... | ... | ... | ... |
| 25 Previously reported Defects | | | | | | |

DEFECT REPORTING IN APPLICATION TESTING

BACKGROUND

Generally, applications may be designed and developed over a period of time. In the development stage, applications may be test-run, for example, by developers or testers, to check functioning, of the applications and to identify any defects occurring during the test-run of the applications. The defects identified during the test-run of the applications may be reported by the developers or the testers, and the applications may then be further developed to address the reported defects or bugs for substantially error-free running of the applications.

BRIEF DESCRIPTION OF DRAWINGS

The following detailed description references the drawings, wherein:

FIG. 2(b) illustrates an example display of an add-defect graphic user interface over a testing instance of an application consistent with disclosed implementations;

FIG. 2(c) illustrates an example display of a summary of previously reported defects in a display layer over a testing instance of an application consistent with disclosed implementations;

DETAILED DESCRIPTION

Figure 1A:
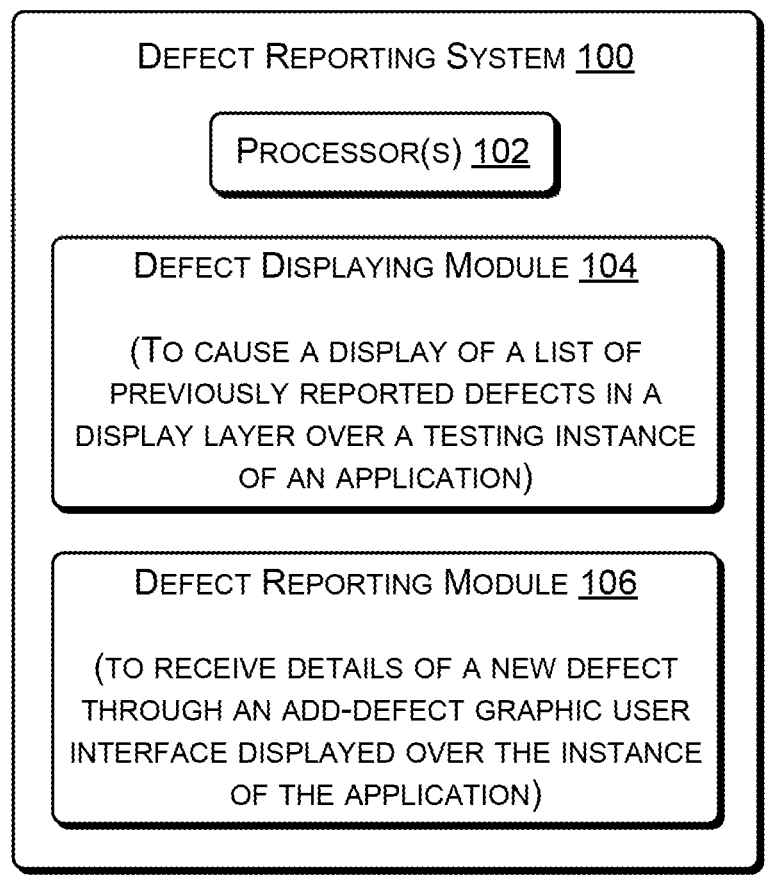
FIG. 1(a) illustrates an example defect reporting system consistent with disclosed implementations.

Methods and systems of defect reporting in application testing are described. Defects may refer to errors that may be identified during testing of an application. An error may be identified when the actual outcome of running of the application deviates from the expected outcome.

Generally, in a testing phase, an application may be tested by multiple persons over a period of time. In an example, the testing phase may be an alpha testing phase. The persons involved in testing of the application may include developers, testers, quality assurance persons, and stakeholders. With multiple persons testing an application in a testing phase, the same defects may be reported several times. With the duplication in the reporting of defects, the number of defects being reported during the testing of the application may be incorrect, i.e., much more than the actual number of defects occurring for the application.

Further, the application testing and the defect reporting may be performed by separate systems. A context switch may have to be performed between two systems in order to allow the person involved in the testing of the application to report a defect for the application. Context switch as used herein may be understood as switching of context, i.e., process being executed, from application testing to defect reporting and then back to application testing. Thus, in the context switch, application testing may be paused while a defect is being reported and resumed after the defect is reported. For this, a current state of the application testing may be stored at the time of reporting of a defect, and the current state may be restored after the reporting of the defect. With the pausing and resuming of the application testing for the defect reporting, the time taken for the reporting of defects for overall testing of the application may be substantially large.

The present subject matter relates to methods and systems of defect reporting in application testing. In one example, defects that are previously reported for the application may be displayed over a testing instance of the application. The testing instance of the application may be a session of the application that relates to an aspect, such as a functionality of the application under test. For example, the aspect of the application can be installation, login authentication, etc., and accordingly the testing instance can be a session of the application related to testing of installation, testing of login page, etc. The testing instance of the application may be depicted in a display page displayed to the user while the application is test-running. Displaying the previously reported defects over the testing instance of the application may allow a user to view the already reported defects corresponding to the aspect being tested in the testing instance while the application is test-running. Such a display of the previously reported defects may be referred to as a display in context with the application being tested. The user herein may include a person, such as a developer, a tester, a stakeholder, and the like, who is involved in the testing of the application.

In accordance with the present subject matter, a user-input indicative of one of acceptance and rejection of a defect, from the displayed previously reported defects, may be received by the system. The user-input may be understood as an input provided by the user. The user-input for a defect may be aggregated with previous user-inputs received from other users for the same defect to determine whether the defect is relevant or irrelevant to the testing instance of the application. When a defect is determined to be irrelevant, the defect may be removed from the displayed list of previously reported defects. In an example, the user may reject a defect if the defect is redundant with respect to one or more other defects. Determining such a defect as irrelevant based on aggregation of the user-input and the previous user-inputs may facilitate reduction of duplication of defects that may be reported while testing of an application. In another example, the user may reject a defect if the defect corresponds to a different aspect than that being tested in the testing instance. Determining such a defect as irrelevant may help in ensuring that defects relevant to the aspect being tested in the testing instance are displayed in context. In yet another example, the user may reject a defect if the defect is not observed by the user even though the defect may have been observed and reported by the other users. This may happen, for example, because of a difference in the testing environment. Determining such a defect as irrelevant may help in better diagnosis and resolution of the defect.

Further, in accordance with the present subject matter, new defects can be added by a user through an add-defect graphic user interface (GUI) displayed over the testing instance of the application. The add-defect GUI may allow the user to add new defects while the application is test-running. In accordance with the present subject matter, the new defects can be added in context with the application, i.e., without any context switch, as the application testing may not be, paused during and resumed after the reporting of new defects. With this, the overall time taken for the reporting or adding of new defects by users during the testing of the application can be reduced.

The following detailed description refers to the accompanying drawings Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1(a) illustrates an example defect reporting system 100 consistent with disclosed implementations. The defect reporting system 100 may be implemented in various ways. For example, the defect reporting system 100 may be a special purpose computer, a server, a mainframe computer, and/or any other type of computing device. The defect reporting system 100 enables defect reporting, in accordance with the present subject matter, during the testing of applications.

The defect reporting system 100 includes processor(s) 102. The processor(s) 102 may be, implemented as microprocessors, microcomputers, microcontrollers, digital signal processors, central processing units, state machines, logic circuitries, and/or any devices that manipulate signals based on operational instructions. Among other capabilities, the processor(s) 102 may fetch and execute computer-readable instructions stored in a memory coupled to the processor(s) 102 of the defect reporting system 100. The memory may include any non-transitory computer-readable storage medium including, for example, volatile memory (e.g., RAM), and/or non-volatile memory (e.g., EPROM, flash memory, NVRAM, memristor, etc.). The functions of the various elements shown in FIG. 1(a), including any functional blocks labeled as "processor(s)", may be provided through the use of dedicated hardware as well as hardware capable of executing computer-readable instructions.

As shown in FIG. 1(a), the defect reporting system 100 includes a defect displaying module 104 and a defect reporting module 106. The defect displaying module 104 and the defect reporting module 106, amongst other things, include routines, programs, objects, components, data structures, and the like, which perform particular tasks or implement particular abstract data types. The defect displaying module 104 and the defect reporting module 106 may be coupled to, and executed by, the processor(s) 102 to perform various functions for the purposes of defect reporting, in accordance with the present subject matter, during the testing of an application.

In an example implementation, while testing of an application, the defect displaying module 104 may cause a display of a list of previously reported defects over a testing instance of the application. The defect displaying module 104 may cause the overlay display of the list of previously reported defects on a user device through which a user is accessing the defect reporting system 100 for defect reporting while testing an application. With this, the user can view the previously reported defects on the user device and over the testing instance while the application is test-running. The defect displaying module 104 may cause the overlay display on the user device by sending display instructions with the list of previously reported defects to the user device. The previously reported defects may include defects that have been already reported for the testing instance of the application.

The defect reporting module 106 may also cause a display of an add-defect GUI over the testing instance of the application and may receive details of a new defect through the add-defect GUI. The new defect may include a defect that may be observed during the testing of the application and may not be present in the displayed list of previously reported defects. The details of the new defect may include defect metadata of the new defect. The defect metadata may include, but is not restricted to, a name of the new defect. The defect displaying module 104 may cause the overlay display of the add-defect GUI on the user device through which the user is accessing the defect reporting system 100 for defect reporting while testing an application. With this, the user can add new defects through the user device and over the testing instance while the application is test-running. The defect displaying module 104 may cause the overlay display on the user device by sending display instructions with the add-defect GUI to the user device. The defect reporting module 106 may associate the details of the new defect with the application being tested, so that the new defect, once reported, can be displayed in the overlay display of the list of the previously reported defects for the application.

Further, in an example implementation, the defect reporting module 106 may receive a user-input for acceptance or rejection of a previously reported defect from the displayed list of the previously reported defects. A user-input for the acceptance may be received if, according to a user involved in the testing of the application, the previously reported defect is related to the testing instance of the application. A user-input for the rejection may be received if, according to the user, the previously reported defect is a redundant defect, or is not related to the testing instance of the application, or is not observed by the user but has been observed and reported by other users.

After receiving, the user-input for a previously reported defect, the defect reporting module 106 may aggregate the received user-input with previous user-inputs indicative of acceptance or rejection of the same previously reported defect. The previous user-inputs may refer to the user-inputs that have been already received from other users for the same previously reported defect during application testing of the same testing instance by the other users. Based on the aggregation, the defect reporting module 106 may determine whether the previously reported defect is relevant or irrelevant to the testing instance of the application, and may remove the previously reported defect from the displayed list when the previously reported defect is determined to be irrelevant to the testing instance of the application.

The details of display of previously reported defects and addition of new defects over the testing of the application, and the removal of one or more previously reported defects from the displayed list are further described later in the description.

Figure 1B:
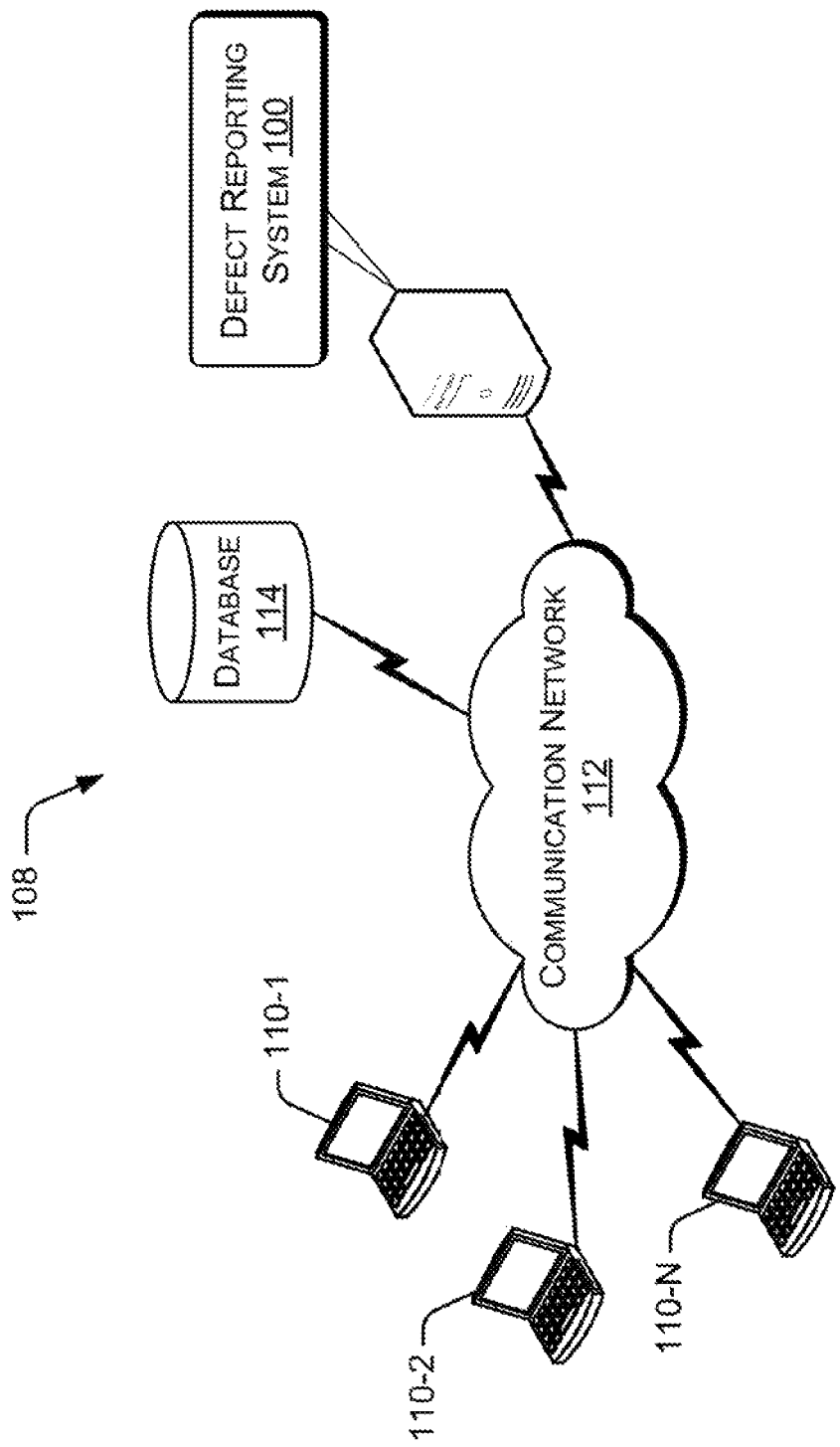
FIG. 1(b) illustrates an example network environment implementing a defect reporting system consistent with disclosed implementations.

FIG. 1(b) illustrates an example network environment 108 implementing the defect reporting system 100 consistent with disclosed implementations. The network environment 108 may be a public network environment or a private network environment or a combination of the two. The defect reporting system 100 may be a computing device, for example, a server, as shown in FIG. 1(b). The defect reporting system 100 may be used for testing of applications, in addition to reporting of defects while testing an application.

The network environment 108 includes user devices 110-1, 110-2, . . . , 110-N, through which a plurality of users can access the defect reporting system 100 for defect reporting while testing an application. The user devices 110 may include, but are not limited to, laptops, desktop computers, tablets, and the like. Further, the user devices 110 and the defect reporting system 100 may be communicatively coupled to each other through a communication network 112. The communication network 112 may be a wireless network, a wired network, or a combination thereof. The communication network 112 can also be an individual network or a collection of many such individual networks, interconnected with each other and functioning as a single large network, e.g., the Internet or an intranet. The communication network 112 can be implemented as one of the different types of networks, such as intranet, local area network (LAN), wide area network (WAN), and the internet. The communication network 112 may either be a dedicated network or a shared network, which represents an association of the different types of networks that use a variety of protocols, for example, Hypertext Transfer Protocol (HTTP) and Transmission Control Protocol/Internet Protocol (TCP/IP), to communicate with each other.

In an example implementation, the user devices 110 and the defect reporting system 100 may be communicatively coupled over the communication network 112 through one, or more communication links. The communication links are enabled through a desired form of communication, for example, via dial-up modem connections, cable links, and digital subscriber lines (DSL), wireless or satellite links, or any other suitable form of communication. While FIG. 1(b) shows user devices 110 and defect reporting system 100 communicatively coupled through the communication network 112, the user devices 110 may be directly coupled to the defect reporting system 100.

Further, as shown in FIG. 1(b), the defect reporting system 100 may be communicatively coupled to a database 114 through the communication network 112. The database 114 may serve as a repository for storing data that may be fetched, processed, received, or generated by the defect reporting system 100. The data includes, for example, metadata and data associated, with user-inputs that may be generated in defect reporting system 100. The data generated by the defect reporting system 100 may be transmitted to the database 114, and the data stored in the database 114 may be fetched by the defect reporting system 100, over the communication network 112. Although the database 114 is shown external to the defect reporting system 100, it may be understood that the database 114 can reside in the defect reporting system 100. Further, while FIG. 1(b) shows the database 114 and defect reporting system 100 communicatively coupled through the communication network 112, the database 114 may be directly coupled, to the defect reporting system 100.

The description hereinafter describes, in detail, the procedure of defect reporting using the defect reporting system 100, while testing an application. An application may be tested for a variety of aspects, including installation, login authentication, data rendering, or any functionality of the application.

For the purpose of testing the application, a user may access the defect reporting system 100 through a user device 110. The user may login to the defect reporting system 100 through the user device 110. The user may be provided with login credentials in order to allow them to test the application and report defects using the defect reporting system 100. The defect reporting system 100 may validate the login credentials entered by the user to authenticate the user for testing the application and reporting the defects. The user may accordingly initiate execution of the application in order to test the installation.

In an example implementation, the defect displaying module 104 may determine a category of application testing. The category of application testing may indicate the aspect of the application that is being tested. In an example, a web-based application may be tested for web-login. For said example, the category may be "login testing". In another example, a utility application may be tested for installation. For said example, the category may be "Installation testing". The defect displaying module 104 may determine the category of application testing automatically based on the testing instance of the application. For this, in an example, the defect displaying module 104 may identify keywords from the display page that depicts the testing instance of the application, and perform a text comparison between the identified keywords and predefined categories. The keywords may be identified from the display code corresponding to the display page of the application, or by hyper text markup language (HTML) parsing of the display page of the application.

After determining the category of application testing, the defect displaying module 104 may cause a display of a list of previously reported defects associated with the category of application testing on the user device 110. The defect displaying module 104 may cause the display of the list of previously reported defects in a display layer over the testing instance of the application. For this, the defect displaying module 104 may pool all the previously reported defects that are tagged with the determined category of application testing and cause the display of the list of previously reported defects over the testing instance of the application. The previously reported defects may be fetched from the database 114 for the purpose of displaying. In one example, each defect stored in the database 114 is tagged with the category of application testing when it was reported. So, when the application is being tested, the associated previously reported defects can be identified based on the category of application testing and displayed over the testing instance.

In an example implementation, the defect displaying module 104 may overlay the list of previously reported defects on the testing instance of the application, such that the displayed list of previously reported defects changes as the user navigates to a different page or screen on the user device 110.

In the overlay display, the defect displaying module 104 may display metadata associated with the each of the previously reported defects. The metadata, also referred to as defect metadata, may include for each of the previously reported defects a name of the previously reported defect, and at least one of defect related comments, a screenshot, a defect criticality factor, defect reporting date and time, user details, defect resolving priority, and defect reporting count, associated with the previously reported defect. The name may refer to the title of defect that may be provided by the user. The defect related comments may include a description or notes that may be provided by the user to describe the defect. The screenshot may include a screenshot that may be provided by the user to illustrate the defect. The defect criticality factor may indicate a level of criticality of the defect. In an example, the defect criticality factor may be a numerical value selected from a predefined scale of, for example, 1 to 5, to set the level of criticality for the defect. Further, the defect reporting date and time may indicate the date and the time at which the defect was reported by the user. The user details may refer to the details of the user who reported the defect. In an example, the user details may include the user name associated with the user. The defect reporting count may be a numerical value indicating the number of times the defect is reported by different users. Further, the defect resolving priority may indicate to a priority level of resolution of the defect during the development stage.

The defect metadata may be fetched by the defect displaying module 104 from the database 114 for the purpose of displaying. It may be noted that the metadata associated with a defect may be generated by the defect reporting system 100 when the defect is newly reported by a user, and subsequently stored in the database 114. The generation of the metadata is described later with respect to the description for addition of a new defect.

Further, after the list of previously reported defects is displayed over the testing instance of the application, the user may choose not to add a new defect if the defect they intend to add is already present in the displayed list of previously reported defects. The user may also increase the defect reporting count associated with a previously reported defect by one, if the user observes a defect that is the same as that previously reported defect. In an example implementation, the defect reporting module 106 may allow the user to increase the defect reporting count for a previously reported defect. For this, a field that represents the defect reporting count may be provided in the overlay display as an editable field where the user can increase the count. In an example implementation, a user selectable button indicating 'add 1' or '+1' may be provided against each previously reported defects for increasing the defect reporting count. The user may provide an input to select the button to increase the count. The defect reporting module 106 may receive this user-input and accordingly increase the defect reporting count corresponding to the previously reported defect.

Further, in an example implementation, the defect reporting module 106 may receive details of a new defect being reported by the user. The details of the new defect are received through an add-defect GUI, where the add-defect GUI is displayed over the testing instance of the application. For this, the defect reporting module 106 may cause an overlay display of the add-defect GUI on the display page of the application on the user device 110 to allow the user to add the new defect. The details of the new defect may include defect metadata of the new defect. The defect metadata may include at least the name of the new defect. In an example, for testing of login of a web-based application, the name of new defect can be "password error". In another example, for testing of installation of a utility application, the name of the new defect can be "installation progress error" In an example implementation, a user selectable button may be provided on the display layer to allow the user to add a new defect. The add-defect GUI may be displayed over the testing instance after the user selectable button is selected by the user.

The defect reporting module 106 may then tag the details of the new defect with the category of application testing. As mentioned earlier, the tagging of the new defect with the category of application testing enables displaying the newly added defect in the list of previously reported defects over the testing instance of the application. For this, the display layer that displays the list of previously reported defects may be refreshed by the user, or periodically by the defect displaying module 104, it may be noted that since the adding of the new defect is through the add-defect GUI over the testing instance of the application, the information associated with the new defect in the add-defect GUI changes as the user navigates to a different page or screen on the user device 110.

In an example, the defect metadata for the new defect may further include at least one of defect related comments, a screenshot, a defect criticality factor, defect reporting date and time, user details, defect resolving priority, and defect reporting count, as mentioned earlier. While receiving the details of the new defect, the defect reporting module 106 may allow the user to provide defect related comments, a screenshot, and a defect criticality factor through the add-defect GUI. In an example, the user may provide the defect criticality factor based on a predefined scale of level of criticality for the defect. In an example, the predefined scale may be from 1 to 5. Further, the defect reporting module 106 may set the defect reporting count to one for the new defect. Further, the defect reporting module 106 may collect the defect reporting date and time automatically from the user device 110 or from the defect reporting system 100, and may collect the user details based on the login credentials of the user.

Further, the defect reporting module 106 may set the defect resolving priority based on the defect criticality factor. The higher the defect criticality factor, the higher is the defect resolving priority set. In an example, the priority level of resolution of defect indicated by the defect resolving priority may be represented by a numerical value or a color coded representation. The highest priority level may be indicated by 1 and relatively lower priority levels may be indicated by higher numbers. Alternatively, the highest priority level may be indicated by red color impression and relatively lower priority levels may be indicated by other colors, for example, orange, yellow, and green.

Further, after the list of previously reported defects is displayed over the testing instance of the application, the defect reporting module 106 may receive a user-input indicative of acceptance or rejection of a previously reported defect from the displayed list. For this, in an example implementation, user selectable buttons may be provided against each previously reported defect in the display layer, which may allow the user to accept or reject the respective previously reported defect. In an example, a user selectable button depicting '✓' may be provided for acceptance and a user selectable button depicting 'X' may be provided for rejection. The user may select the button depicting '✓' against a previously reported defect to accept that defect. The user may select the button depicting 'X' against a previously reported defect to reject that defect. In, an example, user-inputs for more than one previously reported defect from the displayed list, may be received by the defect reporting module 106.

In an example, the user may select to reject a previously reported defect if that defect is a redundant defect. The user may be able to identify redundant defects based on the similarity in the metadata associated with the previously reported defects. In an example, the user may select to reject a previously reported defect if that defect does not correspond to the aspect of the application being tested, or to the category of application testing. The user may be able to identify such a defect based on the defect related comments or the screenshot which may not relate to the category of application testing. Further, in an example the user may select to reject a previously reported defect if the corresponding user details are for a user who is not authorized to test the application. Further, in an example, the user may select to reject a previously reported defect if that defect is not observed by the user during the testing of the application.

On receiving the user-input for a previously reported defect, the defect reporting module 106 may collect testing environment metadata associated with the user-input. The testing environment metadata may be understood as the metadata related to the computing environment present at the time of receiving of the user-input and in which the application is being tested. In an example, the testing environment metadata may include details of the operating system, web-browser, and such, used for the testing of the application. In addition to the testing environment metadata, the defect reporting module 106 may collect user comments for the acceptance or the rejection of the previously reported defect, as the case may be, indicated by the user-input.

After receiving the user-input for a previously reported defect and collecting the testing environment metadata and the user comments associated with the user-input, the defect reporting module 106 may analyze the testing environment metadata and the user comments, previous testing environment metadata and previous user comments associated with previous user-inputs for the previously reported defect, and the defect metadata associated with the previously reported defect. Here, the previous user-inputs may be understood as user-inputs that have been already provided by other users for the acceptance or the rejection of the same defect. The previous testing environment metadata and the previous user comments refer to the data collected on receiving the respective previous user-inputs. In an example implementation, the data, as mentioned above, may be aggregated using a machine learning technique to analyze the data to determine whether the previously reported defect is relevant or irrelevant to the testing instance of the application. Based on the analysis, a score is assigned to the previously reported defect, and if the assigned score is more than a threshold score, the previously reported defect may be determined to be irrelevant to the testing instance of the application.

Further, when the previously reported defect is determined to be irrelevant to the testing instance, the defect reporting module 106 may remove the previously reported defect from the list of the previously reported defects displayed over the testing instance.

Further, in an example implementation, the defect displaying module 104 may cause a display of a summary of the previously reported defects on the user device 110. The summary is displayed in a display layer over the testing instance of the application. The summary may at least include a number of previously reported defects and an attribute indicative of a level of criticality of resolving the previously reported defects. In an example, the level of criticality of resolving the previously reported defects may be determined based on the number of previously reported defects. In another example, the level of criticality of resolving the previously reported defects may be determined based on an average of defect criticality factors associated with the previously reported defects. The higher the number of previously reported defects or the average of defect criticality factor, as the case may be, the higher is the level of criticality of resolving the previously reported defects. The attribute that indicates the level of criticality of resolving the previously reported defects may include a color coded representation.

In an example, the display layer with the summary may be displayed as a block, referred to as a summary block over the testing instance of the application. The summary block may display the number of previously reported defects and is highlighted with a color indicating the level of criticality of resolving the previously reported defects. The summary block may be highlighted with red color, orange color, yellow color, or green color, to indicate the level of criticality from highest to lowest. The summary block may also be flashed to indicate the highest level of criticality.

In an example implementation, the summary may also include the date and time at which the last defect was reported by any user. In an example implementation, the display layer displaying the list of previously reported defects may be collapsed to form the summary block. A user selectable button may be provided on the summary block to allow the user to expand the summary block to display the list of previously reported defects. Another user selectable button may be provided on the summary block to allow the user to report a new defect.

Figure 2A:
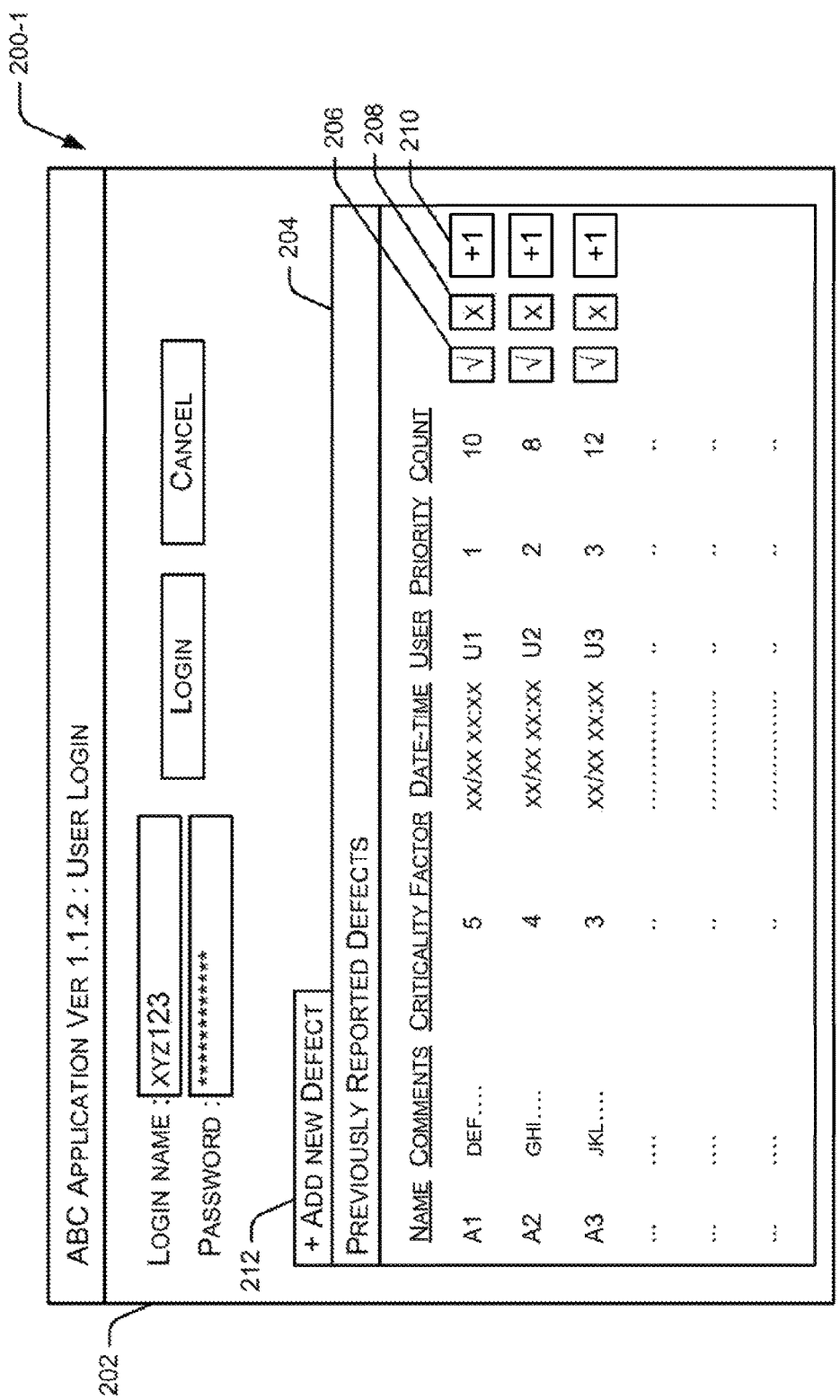
FIG. 2(a) illustrates an example display of a list of previously reported defects in a display layer over a testing instance of an application consistent with disclosed implementations.
Figure 2B:
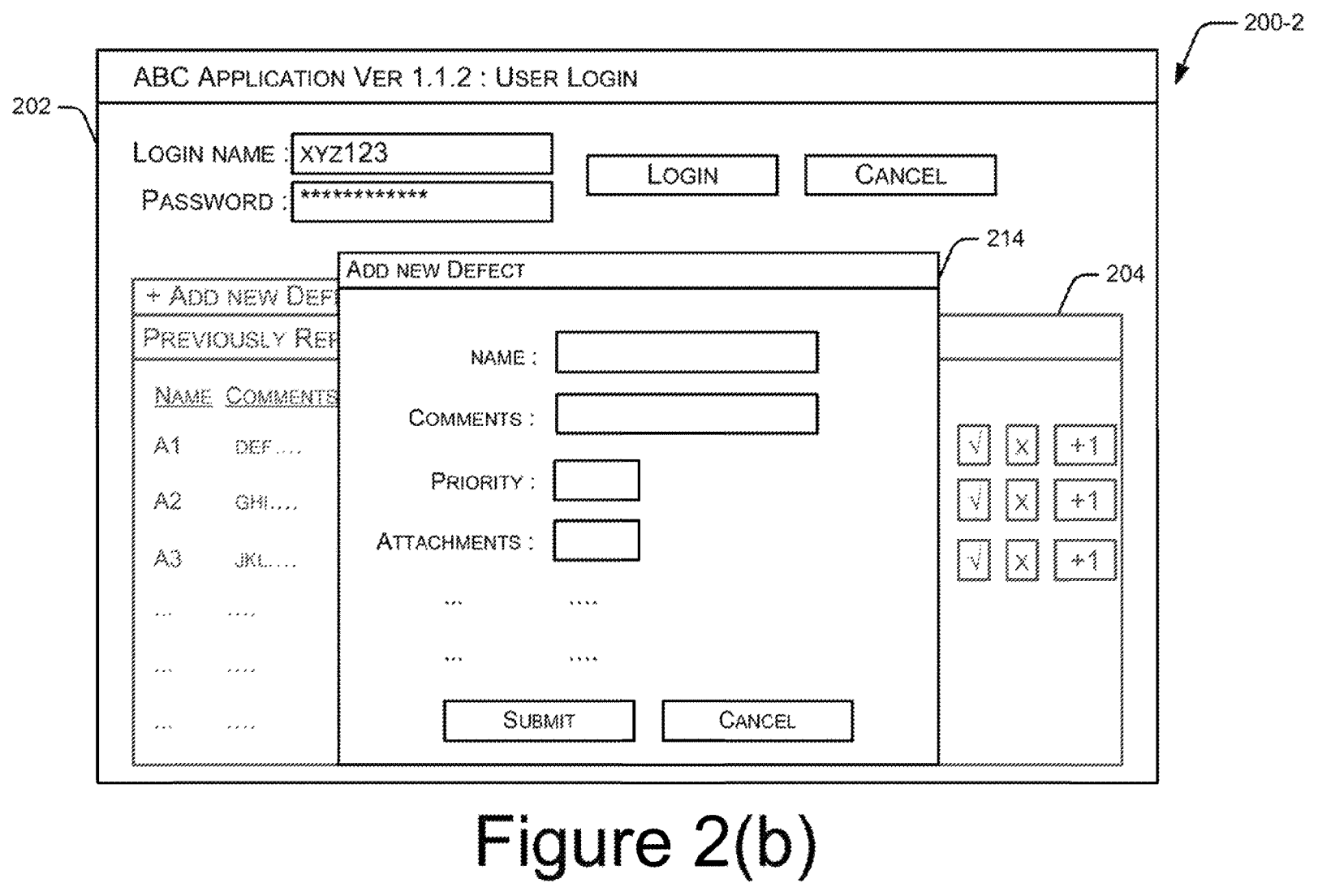

FIG. 2(*a*) illustrates an example display 200-1 of a list of previously reported defects in a display layer over a testing instance of an application consistent with disclosed implementations. In the example illustrated herein, the application "ABC Application Ver 1.1.2" is being tested for user login. The testing instance of the application is depicted in the display page 202 at the background on the display 200-1. The display page 202 shows details login name and password that may be entered by the user to test the user login for the application. While the user login is being tested, the list of previously reported defects is displayed in a display layer 204 over the display page 202 of the application. As shown, the defect metadata associated with each of the previously reported defects is displayed in the display layer 204. Along with the defect metadata, a '✓' button 206 and a 'X' button 208 are displayed against each of the previously reported defects. The '✓' button 206 and the 'X' button 208 are provided to allow the user to accept or reject respective previously reported defects. In addition, a '+1' button 210 is provided against each of the previously reported defects, to allow the user to increase the defect reporting count for the respective previously reported defects by one. Further, a '+ add new defect' button 212 is displayed with the display layer 204 over the display page 202, to cause a display of an add-defect GUI that allows the user to add a new defect while the testing of the application.

FIG. 2(*b*) illustrates an example display 200-2 of an add-defect GUI 214 displayed over a testing instance of an application consistent with disclosed implementations. As shown, the add-defect GUI 214 is displayed over the display page 202 and over the display layer 204 that displays the list of previously reported defects. Various fields are displayed in the add-defect GUI 214 to collect defect metadata for the new defect. As shown, the fields include, but are not restricted to, name of the defect, comments, priority, attachments, and such. Further, buttons for 'submit' and 'cancel' are also displayed to allow the user to submit the new defect or cancel the submission of the new defect.

FIG. 2(*c*) illustrates an example display 200-3 of a summary of previously reported defects in a display layer over a testing instance of an application consistent with disclosed implementations. The summary is displayed in a summary block 216 over the display page 202 of the application. The summary block 216, as shown, includes a number of previously reported defects. In addition, the summary block 216 is highlighted with a color indicating the level of criticality of resolving the previously reported defects. It may be noted that the summary block 216 may be displayed when the display layer 204 with the list of previously reported defects is collapsed by the user. The display layer 204 has a '−' button 218 that may be clicked by the user to collapse the display layer 204 to cause the display of the summary block 216. The summary block 216 has a '+' button 220 through which the user can expand the summary block 216 to cause the display of the display layer 204.

Figure 3:
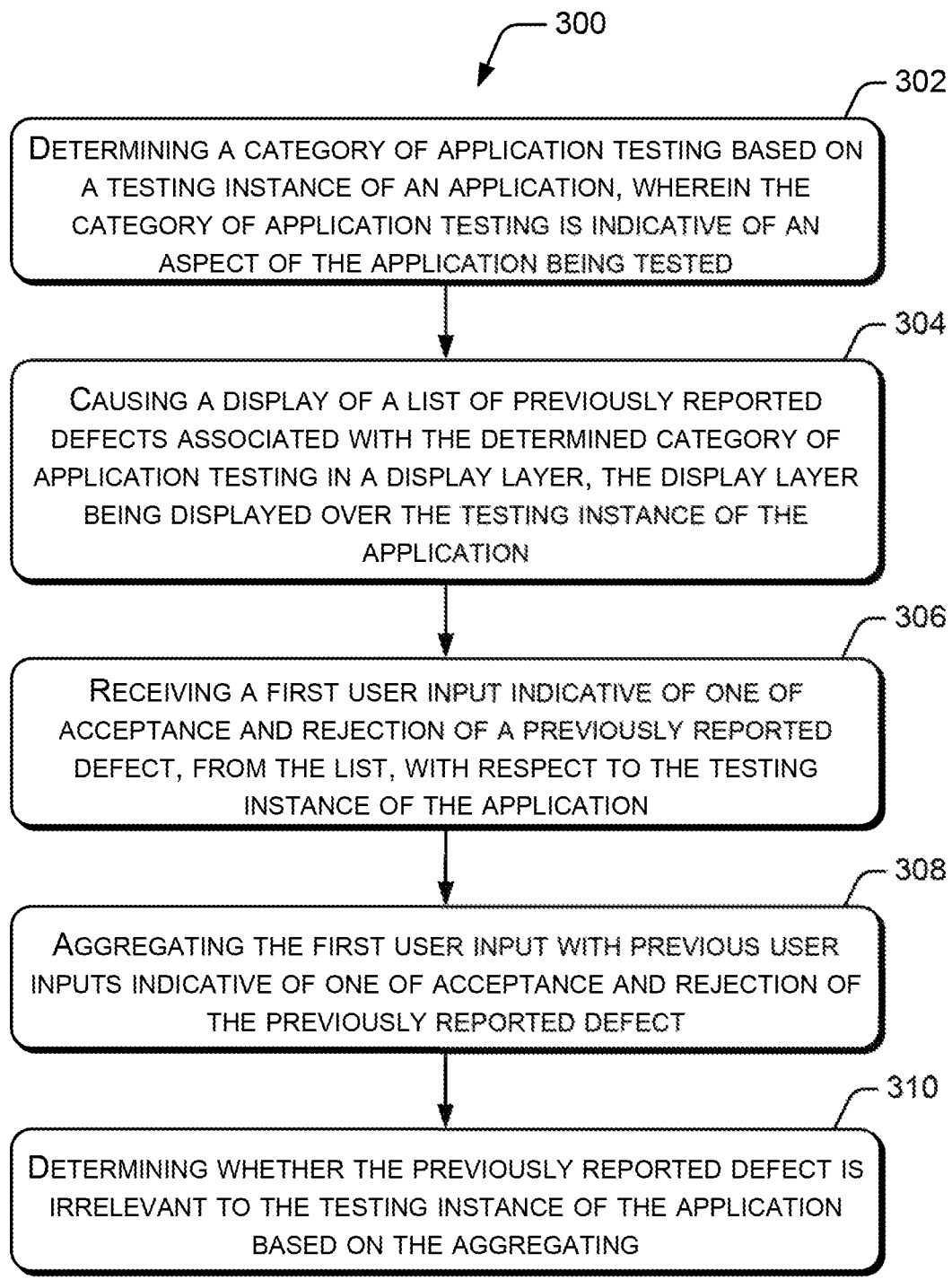
FIG. 3 illustrates an example method of defect reporting in application testing consistent with disclosed implementations.

FIG. 3 illustrates an example method 300 of defect reporting in application testing consistent with disclosed implementations. The order in which the method 300 is described is not intended to be construed as a limitation, and any number of the described method blocks can be combined in any order to implement the method 300. Furthermore, the method 300 can be implemented by processor(s) or computing device(s) through any suitable hardware, non-transitory machine readable instructions, or combination thereof. Further, although the method 300 is described in context of the aforementioned defect reporting system 100 in the network environment 108, other suitable computing devices or systems may be used for execution of at least one step of method 300. It may be understood that steps of method 300 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 3, at block 302, a category of application testing is determined based on a testing instance of the application. As mentioned earlier, the category is indicative of the aspect of application being tested, for example, installation, login authentication, and such. In an example implementation, the category of application testing is determined by the defect displaying module 104 of the defect reporting system 100 in a manner as described earlier in the description.

At block 304, a display of a list of previously reported defects associated with the determined category of application is caused. The list of previously reported defects is displayed in a display layer over the testing instance of the application on the user device 110. In an example, the list of previously reported defects is displayed over or on top of the display page associated with the testing instance of the application. In an example implementation the previously reported defects are fetched from the database 114 and caused to display by the defect displaying module 104 of the defect reporting system 100 over the testing instance of the application on the user device 110.

In an example implementation, in displaying the list of previously reported defects, the defect metadata associated with the each previous reported defect may be provided. The defect metadata may include a name of the respective previously reported defect, and at least one of defect related comments, a screenshot, a defect criticality factor, defect reporting date and time, user details, defect resolving priority, and defect reporting count, associated with the respective previously reported defect. The defect metadata may be fetched from the database 114 and displayed by the defect displaying module 104 of the defect reporting system 100.

At block 306, a first user-input is received for a previously reported defect from the displayed list, where the first user-input is indicative of one of acceptance and rejection of the previously reported defect with respect to the testing instance of the application by the user. In an example, the user may provide the first user-input to reject a previously reported defect if that defect is a redundant defect, or if that defect does not correspond to the aspect of the application being tested, or if the user details corresponding to that defect are for a user who, is not authorized to test the application, or if that defect is not observed by the user during the testing of the application. In an example implementation, the first user-input may be received by the defect reporting module 106 of the defect reporting system 100 through user selectable buttons, for example, '✓' and 'X' buttons 206 and 208, provided against the respective previously reported defect on the overlay display layer, as described earlier in the description.

At block 308, the first user-input for the previously reported defect is aggregated with previous user-inputs indicative of one of acceptance and rejection of the previously reported defect and, at block 310, it is determined whether the previously reported defect is irrelevant to the testing instance of the application based on the aggregating. As mentioned earlier, the previous user-inputs may be understood as user-inputs that have been already provided by other users for the acceptance or the rejection of the same defect. In an example implementation, the aggregation may be done by the defect reporting module 106 of the defect reporting system 100 in a manner as described earlier in the description. For the purpose of aggregation, testing environment metadata associated with the first user-input and user comments for the acceptance or the rejection of the previously reported defect in the first user-input may be collected. The collected testing environment metadata and user comments are then analyzed with previous testing environment metadata and previous user comments associated with the previous user-inputs for the previously reported defect, and with the defect metadata associated with the previously reported defect to determine whether the previously reported defect is relevant or irrelevant to the testing instance of the application. As mentioned earlier, the analysis may be performed based on aggregation of data using a machine learning technique.

In an example implementation, when the previously reported defect is determined to be irrelevant to the testing instance, the previously reported defect may be removed from the list of the previously reported defects displayed over the testing instance. The previously reported defect may be removed by the defect reporting module 108 of the defect reporting system 100.

Further, in an example implementation, a second user-input received to increase a defect reporting count associated with a previously reported defect by one to indicate that a new defect being reported by a user is same as the previously reported defect. The second user-input may be received by the defect reporting module 106 of the defect reporting system 100 through a user selectable button, for example, '+1' button 210, provided against the respective previously reported defect on the overlay display layer, as described earlier in the description.

Figure 4:
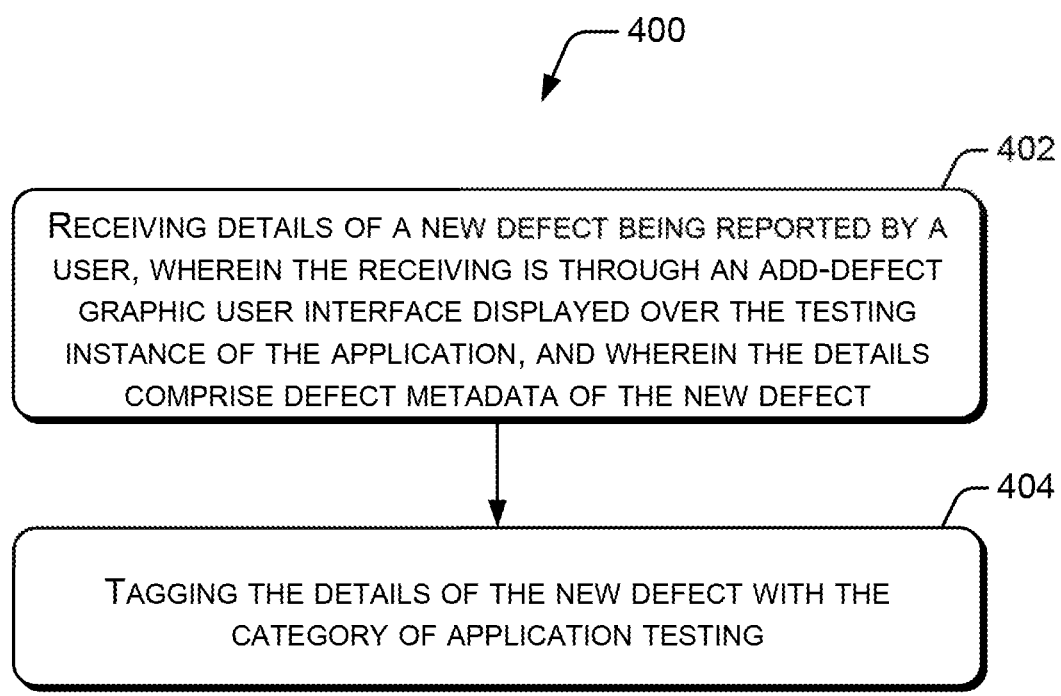
FIG. 4 illustrates an example method of reporting a new defect consistent with disclosed implementations.

FIG. 4 illustrates an example method 400 of reporting a new defect consistent with disclosed implementations. The order in which the method 400 is described is not intended to be construed as a limitation, and any number of the described method blocks can be combined in any order to implement the method 400. Furthermore, the method 400 can be implemented by processor(s) or computing device(s) through any suitable hardware, non-transitory machine readable instructions, or combination thereof. Further, although the method 400 is described in context of the aforementioned defect reporting system 100 in the network environment 108, other suitable computing devices or systems may be used for execution of at least one step of method 400. It may be understood that steps of method 400 can be executed based on instructions stored in a non-transitory computer readable medium, as will be readily understood. The non-transitory, computer readable medium may include, for example, digital memories, magnetic storage media, such as a magnetic disks and magnetic tapes, hard drives, or optically readable digital data storage media.

Referring to FIG. 4, at block 402, details of a new defect being reported by a user are received through an add-defect graphic user interface displayed over the testing instance of the application. The details include defect metadata of the new defect. The defect metadata may include a name of the new defect, and at least one of defect related comments, a screenshot, a defect criticality factor, defect reporting date and time, user details, defect resolving priority, and defect reporting count, for the new defect. As mentioned earlier, a user selectable button, for example, a '+ add new defect' button 212, may be provided on the display layer that displays the list of previously reported defects over the testing instance. The add-defect GUI may be displayed on the user device 110 over the testing instance after the user selectable button is selected by the user. The details of the new defect may be received by the defect reporting module 106 of the defect reporting system 100.

At block 404, the details of the new defect are tagged with the category of application testing. The tagging with the category of application testing enables displaying the newly added defect in the list of previously reported defects over the testing instance of the application. The details of the new defect may be tagged with the category of the application by the defect reporting module 106 of the defect reporting system 100.

Further, in an example implementation, a summary of the previously reported defects may be provided in the display layer over the testing instance of the application. The summary may at least include a number of previously reported defects and an attribute indicative of a level of criticality of resolving the previously reported defects, as described earlier. Also, as mentioned earlier, the defect displaying module 104 of the defect reporting system 100 may cause the display of the summary of the previously reported defects on the user device 110.

Figure 5:
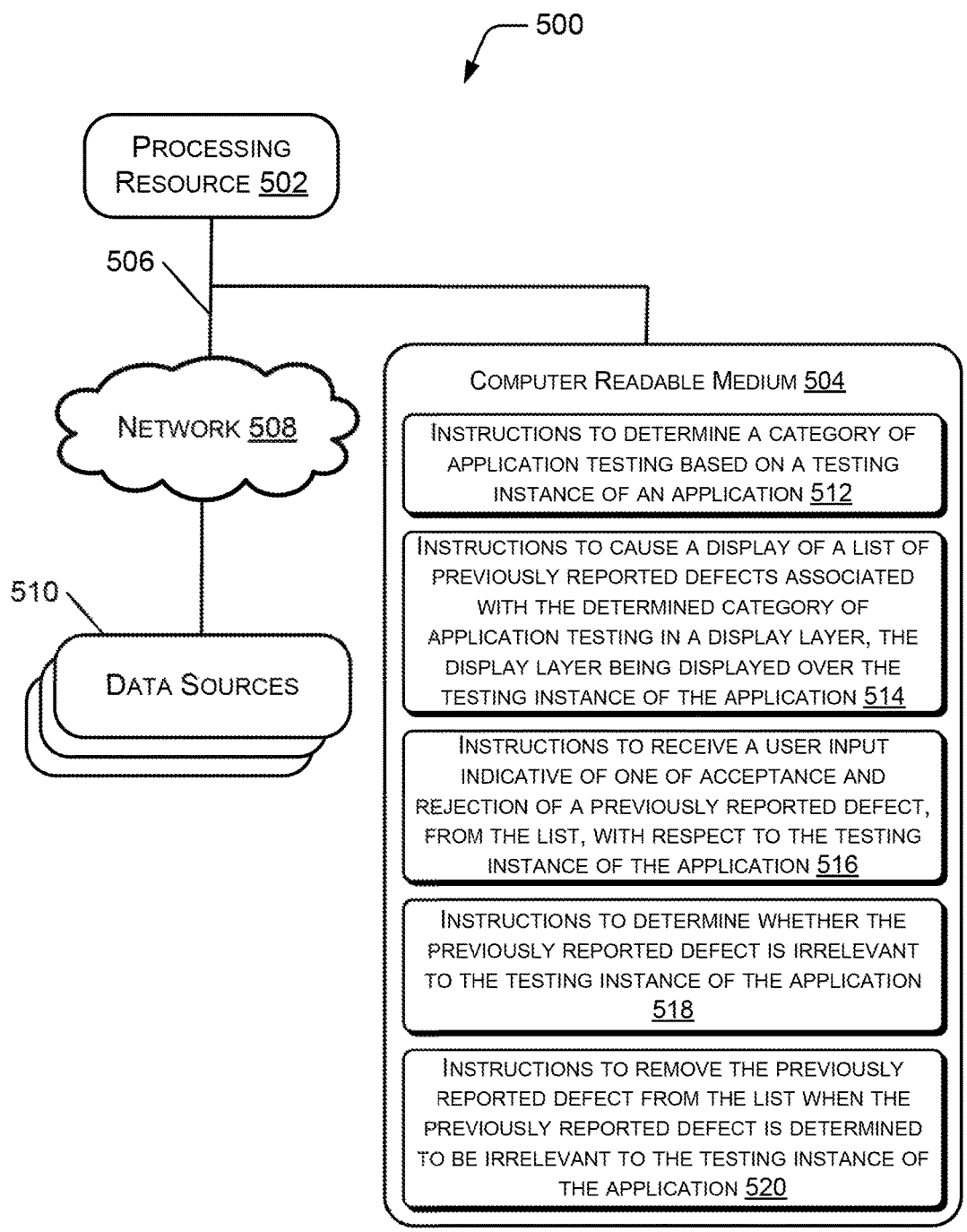
FIG. 5 illustrates an example network environment for defect reporting in application testing consistent with disclosed implementations.

FIG. 5 illustrates an example network environment 500 for defect reporting in application testing consistent with disclosed implementations. The network environment 500 may be a public networking environment or a private networking environment. In an example implementation, the network environment 500 includes a processing resource 502 communicatively coupled to a non-transitory computer readable medium 504 through a communication link 506.

For example, the processing resource 502 can be a processor of the defect reporting system 100. The non-transitory computer readable medium 504 can be, for example, an internal memory device or an external memory device. In an example implementation, the communication link 506 may be a direct communication link, such as any memory read/write interface. In another example implementation, the communication link 506 may be an indirect communication link, such as a network interface. In such a case, the processing resource 502 can access the non-transitory computer readable medium 504 through a network 508. The network 508 may be a single network or a combination of multiple networks and may use a variety of different communication protocols.

The processing resource 502 and the non-transitory computer readable medium 504 may also be communicatively coupled to data sources 510 over the network 508. The data sources 510 can include, for example, user devices through which users can access the defect reporting system 100.

In an example implementation, the non-transitory computer readable medium 504 includes a set of computer readable instructions for defect reporting in application testing. The set of computer readable instructions can be accessed by the processing resource 502 through the communication link 506 and subsequently executed to perform acts for defect reporting.

Referring to FIG. 5, in an example, the non-transitory computer readable medium 504 includes instructions 512 that cause the processing resource 502 to determine a category of application testing based on a testing instance of the application. As mentioned earlier, the category of application testing is indicative of an aspect of the application being tested. The non transitory computer readable medium 504 includes instructions 514 that cause the processing resource 502 to cause a display of a list of previously reported defects associated with the determined category of application testing in a display layer, where the display layer is displayed over the testing instance of the application. The non-transitory computer readable medium 504 also includes instructions 516 that cause the processing resource 502 to receive a user-input indicative of one of acceptance and rejection of a previously reported defect, from the list, with respect to the testing instance of the application, and includes instructions 518 that cause the processing resource 502 to determine whether the previously reported defect is irrelevant to the testing instance of the application. The previously reported defect is determined to be irrelevant based on aggregation of the user-input with previous user-inputs indicative of one of acceptance and rejection of the previously reported defect. The non-transitory computer readable medium 504 further includes instructions 520 that cause the processing resource 502 to remove the previously reported defect from the list when the previously reported defect is determined to be irrelevant to the testing instance of the application.

In an example implementation, the non-transitory computer readable medium 504 further includes instructions that cause the processing resource 502 to collect testing environment metadata associated with the user-input and user comments for one of the acceptance and the rejection of the previously reported defect indicated by the user-input, and analyze the testing environment metadata and the user comments associated with the user-input, previous testing environment metadata and previous user comments associated with the previous user-inputs, and defect metadata associated with the previously reported defect, in the aggregation of the user-input with the previous user-inputs.

Although implementations for defect reporting in application testing have been described in language specific to structural features and/or methods, it is to be understood that the present subject matter is not necessarily limited to the specific features or methods described. Rather, the specific features and methods are disclosed and explained as example implementations for defect reporting in application testing.

We claim:

1. A method of defect reporting in application testing, the method comprising:
   determining, by a computing device, a category of application testing based on a testing instance of an application, wherein the category of application testing is indicative of an aspect of the application being tested;
   pooling, by the computing device, a plurality of previously reported defects associated with the determined category of application testing;

causing a display of a list of the pooled previously reported defects associated with the determined category of application testing in a display layer, the display layer being displayed over the testing instance of the application;

receiving, by the computing device, a first user-input indicative of one of acceptance and rejection of a previously reported defect, from the list of the pooled previously reported defects, with respect to the testing instance of the application;

aggregating, by the computing device, the first user-input with previous user-inputs indicative of one of acceptance and rejection of the previously reported defect, determining, by the computing device, whether the previously reported defect is irrelevant to the testing instance of the application based on the aggregating; and based on a determination that the previously reported defect is irrelevant to the testing instance of the application, removing, by the computing device, the previously reported defect from the list of the pooled previously reported defects displayed in the display layer over the testing instance of the application.

2. The method as claimed in claim 1, wherein the aggregating comprises:

collecting, by the computing device, testing environment metadata associated with the first user-input and user comments for one of the acceptance and the rejection of the previously reported defect indicated by the first user-input; and analyzing the testing environment metadata and the user comments associated with the first user-input, previous testing environment metadata and previous user comments associated with the previous user-inputs, and defect metadata associated with the previously reported defect.

3. The method as claimed in claim 1, wherein the causing the display of the list of the pooled previously reported defects comprises providing defect metadata associated with each of the previously reported defects, wherein the defect metadata comprises a name of the respective previously reported defect and at least one of defect related comments, a screenshot, a defect criticality factor, defect reporting date and time, user details, defect resolving priority, and defect reporting count, associated with the respective previously reported defect.

4. The method as claimed in claim 1, further comprising:

receiving a second user-input to increase a defect reporting count associated with a previously reported defect by one to indicate that a new defect being reported by a user is same as the previously reported defect.

5. The method as claimed in claim 1 further comprising:

receiving details of a new defect being reported by a user, wherein the receiving is through an add-defect graphic user interface displayed over the testing instance of the application, and wherein the details comprise defect metadata of the new defect; and tagging the details of the new defect with the category of application testing.

6. The method as claimed in claim 5, wherein the defect metadata comprises a name of the new defect, and at least one of defect related comments, a screenshot, a defect criticality factor, defect reporting date and time, user details, defect resolving priority, and defect reporting count, for the new defect.

7. The method as claimed in claim 1, further comprising providing, by the computing device, a summary of the previously reported defects in the display layer over the testing instance of the application, wherein the summary comprises at least a number of previously reported defects and an attribute indicative of a level of criticality of resolving the previously reported defects.

8. A defect reporting system for defect reporting in application testing, the defect reporting system comprising:

a processor;

a memory on which is stored instructions that are to cause the processor to, determine a category of application testing based on a testing instance of an application, wherein the category of application testing is indicative of an aspect of the application being tested;

pool a plurality of previously reported defects associated with the determined category of application testing;

cause a display of a list of the pooled previously reported defects associated with the determined category of application testing in a display layer, the display layer being displayed over the testing instance of the application;

receive details of a new defect being reported by a user, wherein the details of the new defect are received through an add-defect graphic user interface displayed over the testing instance of the application, and wherein the details comprise defect metadata of the new defect;

tag the details of the new defect with the category of application testing; and add the new defect in the display of the list of the pooled previously reported defects displayed in the display layer over the testing instance of the application.

9. The defect reporting system as claimed in claim 8, wherein the defect metadata of the new defect comprises a name of the new defect and at least one of defect related comments, a screenshot, a defect criticality factor, defect reporting date and time, user details, defect resolving priority, and defect reporting count, for the new defect.

10. The defect reporting system as claimed in claim 8, wherein the instructions are further to cause the processor to display defect metadata associated with each of the previously reported defects, wherein the defect metadata comprises a name of the respective previously reported defect and at least one of defect related comments, a screenshot, a defect criticality factor, defect reporting date and time, user details, defect resolving priority, and defect reporting count, associated with the respective previously reported defect.

11. The defect reporting system as claimed in claim 8, wherein the instructions are further to cause the processor to, receive a user-input indicative of one of acceptance and rejection of a previously reported defect, from the list of previously reported defects, with respect to the testing instance of the application;

collect testing environment metadata associated with the user-input and user comments for one of the acceptance and the rejection of the previously reported defect indicated by the user-input;

analyze the testing environment metadata and the user comments associated with the user-input, previous testing environment metadata and previous user comments associated with previous user-inputs, and defect metadata associated with the previously reported defect, to determine whether the previously reported defect is irrelevant to the testing instance of the application, wherein the previous user-inputs are indicative of one of acceptance and rejection of the previously reported defect; and remove the previously reported defect from the list when the previously reported defect is determined to be irrelevant to the testing instance of the application based on the analysis.

12. The defect reporting system as claimed in claim 8, wherein the instructions are further to cause the processor to cause a display of a summary of the previously reported defects in the display layer over the testing instance of the application, wherein the summary comprises at least a number of previously reported defects and an attribute indicative of a level of criticality of resolving the previously reported defects.

13. A non-transitory computer-readable medium comprising computer readable instructions for defect reporting in application testing, executable by a processing resource of a computing device to:

determine a category of application testing based on a testing instance of an application, wherein the category of application testing is indicative of an aspect of the application being tested;

pool a plurality of previously reported defects associated with the determined category of application testing;

cause a display of a list of the pooled previously reported defects associated with the determined category of application testing in a display layer, the display layer being displayed over the testing instance of the application;

receive a user-input indicative of one of acceptance and rejection of a previously reported defect, from the list of previously reported defects, with respect to the testing instance of the application;

aggregate the first user-input with previous user-inputs indicative of one of acceptance and rejection of the previously reported defect;

determine whether the previously reported defect is irrelevant to the testing instance of the application based on the aggregation; and based on a determination that the previously reported defect is irrelevant to the testing instance of the application, remove the previously reported defect from the list of the pooled previously reported defects displayed in the display layer over the testing instance of the application.

14. The non-transitory computer-readable medium as claimed in claim 13 comprising computer readable instructions executable by the processing resource to:

collect testing environment metadata associated with the user-input and user comments for one of the acceptance and the rejection of the previously reported defect indicated by the user-input; and analyze the testing environment metadata and the user comments associated with the user-input, previous testing environment metadata and previous user comments associated with the previous user-inputs, and defect metadata associated with the previously reported defect, in the aggregation of the user-input with the previous user-inputs.

\* \* \* \* \*